United States Patent [19]
Douceur et al.

[11] Patent Number: 6,021,203
[45] Date of Patent: Feb. 1, 2000

[54] COERCION RESISTANT ONE-TIME-PAD CRYPTOSYSTEM THAT FACILITATES TRANSMISSION OF MESSAGES HAVING DIFFERENT LEVELS OF SECURITY

[75] Inventors: John R. Douceur; Michael P. Calligaro; Matthew W. Thomlinson, all of Bellevue, Wash.

[73] Assignee: Microsoft Corporation, Redmond, Wash.

[21] Appl. No.: 08/763,333

[22] Filed: Dec. 11, 1996

[51] Int. Cl.$^7$ .................................................. H04L 9/00
[52] U.S. Cl. ................................................ 380/49; 380/21
[58] Field of Search ............................... 380/43, 59, 21, 380/28, 4, 9, 44, 49

[56] References Cited

U.S. PATENT DOCUMENTS

| | | | |
|---|---|---|---|
| 4,405,829 | 9/1983 | Rivest et al. | 380/49 |
| 5,319,735 | 6/1994 | Preuss et al. | 395/2.14 |
| 5,659,726 | 8/1997 | Sandford et al. | 380/49 |

OTHER PUBLICATIONS

Schneier, Bruce, "Applied Cryptography" 1994, pp. 13–16 and 66–68.
Bruce Schneier, Applied Cryptography 2nd edition, and 227–28, Oct. 1995.

*Primary Examiner*—Tod R. Swann
*Assistant Examiner*—Trevor Quick Coddington
*Attorney, Agent, or Firm*—Lee & Hayes, PLLC

[57] ABSTRACT

A protocol is provided for transmitting low security messages and high security messages with one-time-pad cryptosystem. In one implementation of the present invention, low security messages are encrypted using random bit strings in accordance with a one-time-pad encryption scheme. A high security message and a decoy message are embedded within a set of encryption keys and cyphertexts that is to be transmitted from a sender to a receiver. The encryption keys are transmitted over a secure channel from the sender to the receiver, and the cyphertexts are transmitted over a publicly accessible channel from the sender to the receiver. The receiver uses the encryption keys and knowledge regarding keys for a high security message and a decoy message to decrypt the low security messages, extract the high security message and/or decoy message, and decrypt the high security message and/or decoy message. The provision of the decoy message is revealed when duress is applied to coerce the receiver into revealing the key for a supposedly high security message.

64 Claims, 11 Drawing Sheets

| $C_5$ | $C_4$ | $C_3$ | $C_2$ | $C_1$ | $C_0$ | $K_5$ | $K_4$ | $K_3$ | $K_2$ | $K_1$ | $K_0$ |
|---|---|---|---|---|---|---|---|---|---|---|---|
| 1 | 0 | 0 | 1 | 0 | 1 | 1 | 1 | 0 | 1 | 0 | 0 |

Key For High Security Message

Fig. 7

| $C_5$ | $C_4$ | $C_3$ | $C_2$ | $C_1$ | $C_0$ | $K_5$ | $K_4$ | $K_3$ | $K_2$ | $K_1$ | $K_0$ |
|---|---|---|---|---|---|---|---|---|---|---|---|
| 1 | 1 | 0 | 1 | 1 | 0 | 0 | 0 | 0 | 1 | 0 | 1 |

Key For Decoy Message

Fig. 10

COERCION RESISTANT ONE-TIME-PAD CRYPTOSYSTEM THAT FACILITATES TRANSMISSION OF MESSAGES HAVING DIFFERENT LEVELS OF SECURITY

TECHNICAL FIELD

The present invention relates generally to cryptographic systems and, more particularly, to a coercion resistant one-time-pad cryptosystem that facilitates transmission of messages having different levels of security.

BACKGROUND OF THE INVENTION

The one-time-pad (OTP) cryptosystem may take many forms. In its best known form, OTP uses a large non-repeating set of truly random key letters, written on sheets of paper and then glued together in a pad. The sender uses each key letter on the pad to encrypt exactly one plaintext (i.e., non-encrypted) character. The receiver of the message has an identical pad and uses in turn each key on the pad to decrypt each letter of the cyphertext (i.e., the encrypted message). The sender destroys the pad after encrypting the message, and the receiver destroys the pad after decrypting the message.

Figure 1:
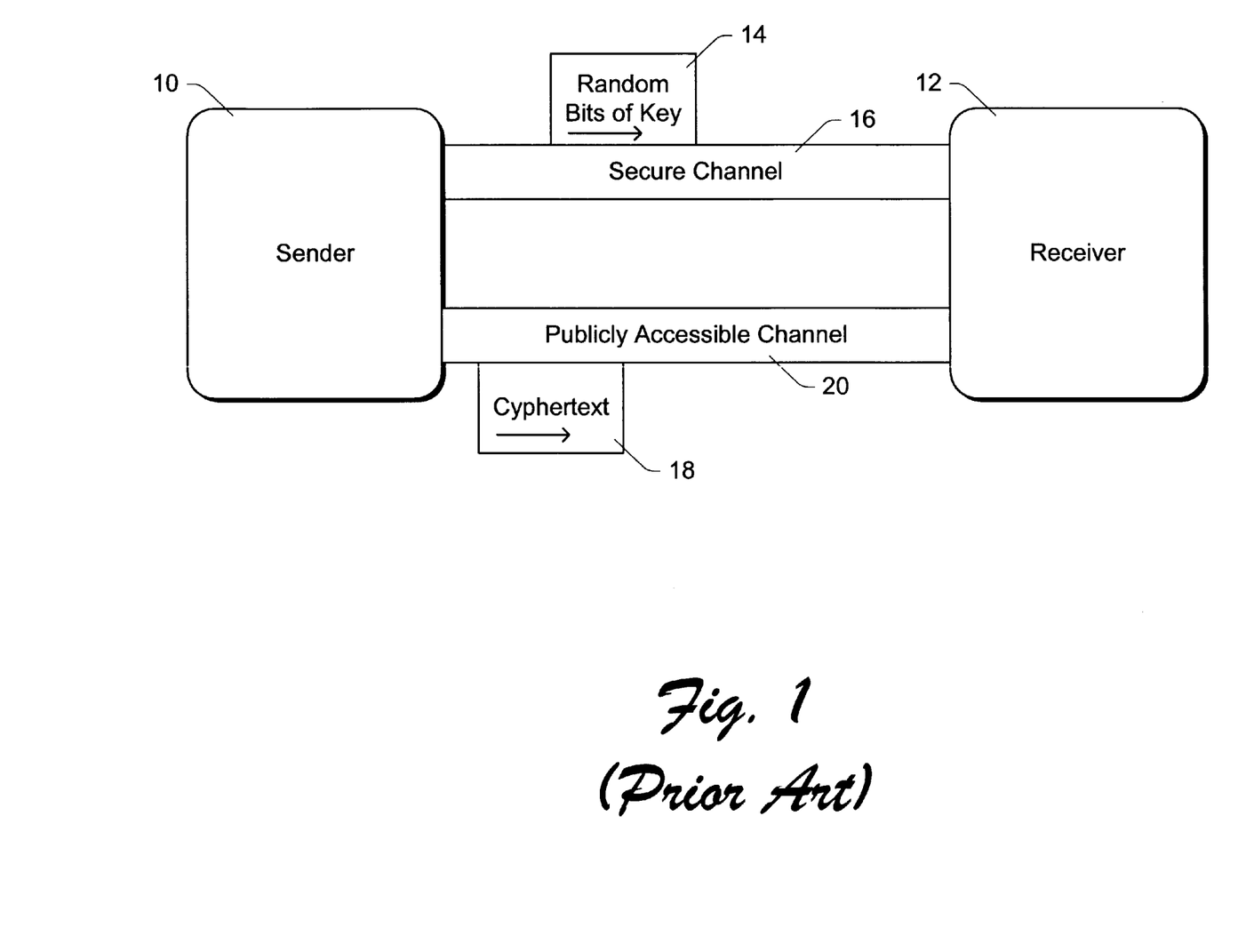
FIG. 1 is a block diagram that illustrates the operation of a conventional one-time-pad (OTP) cryptosystem.
Figure 2:
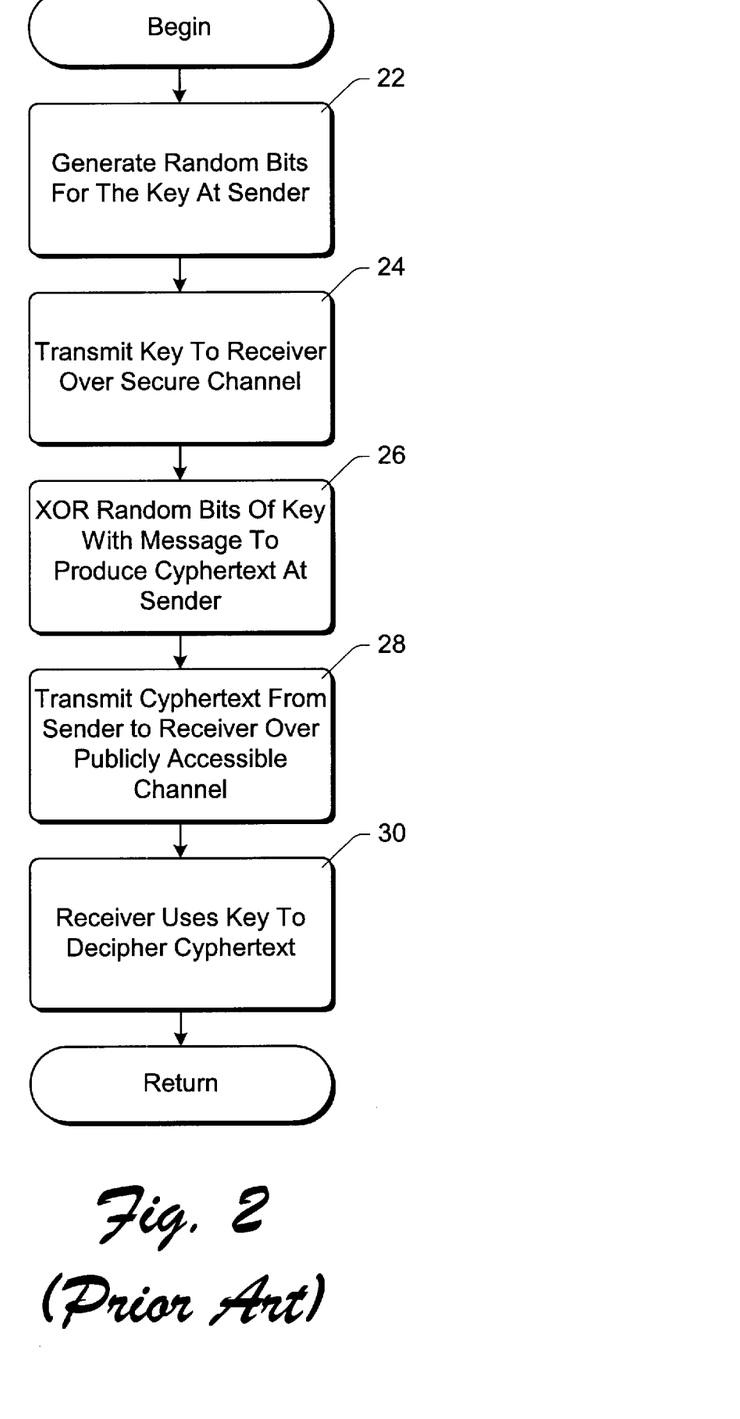
FIG. 2 is a flowchart illustrating the steps that are performed in a conventional OTP cryptosystem.

The OTP approach may be adapted to encrypt digital messages. In such an application, a random string of bits having a length equal to the length of a digital message are used to encrypt the digital message before the message is transmitted. FIG. 1 depicts a block diagram that illustrates operation of an OTP cryptosystem for transmitting digital messages in encrypted form. FIG. 2 is a flowchart that illustrates the steps that are performed in such an OTP cryptosystem. First, a sender 10 (i.e., a party that wishes to send an encrypted message) generates random bits for an encryption key 14 (step 22 in FIG. 2). The number of bits in the key equals the number of bits in the message that is to be encrypted. The random bits of the key 14 are then transmitted over a secure channel 16, that is presumed to be secure against eavesdroppers, to a receiver 12 (step 24 in FIG. 2). The sender 10 encrypts the message by exclusive ORing (XORing) the random bits of the key 14 with the message to produce cyphertext 18 (step 26 in FIG. 2). The cyphertext 18 is then transmitted over a publicly accessible channel 20 from the sender 10 to the receiver 12 (step 28 in FIG. 2). The receiver 12 has already received the random bits of the key 14 and uses the key to decipher (i.e., undo the XOR operation) the cyphertext (step 30 in FIG. 2).

Figure 3:
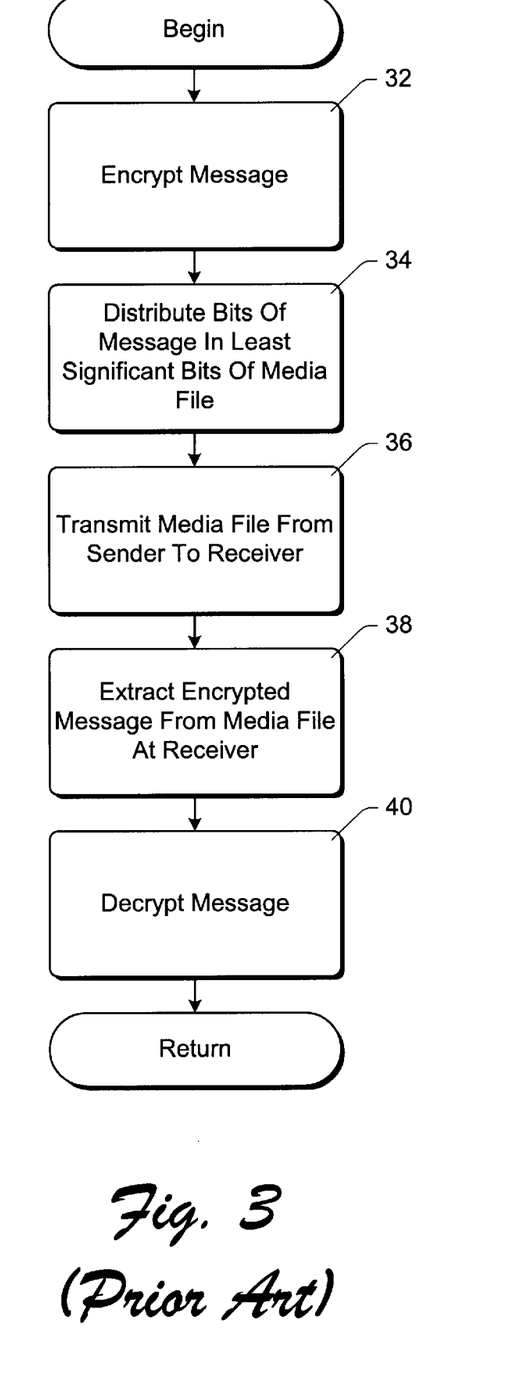
FIG. 3 is a flowchart illustrating the steps that are performed in a conventional stegonographic technique.

There may be some circumstances under which it is necessary for communicating parties to be able to hide not only the contents of a message (such as by encryption of the message) but also evidence that a message was transmitted. Techniques for hiding messages are known as stegonographic methods. FIG. 3 is a flowchart that illustrates the steps that are performed in one popular, conventional stegonographic technique. First, a message is encrypted (step 32 in FIG. 3). The bits of the encrypted message are then distributed among the least significant bits of a media file, such as an audio or video file (step 34 in FIG. 3). The media file is transmitted from the sender to the receiver (step 36 in FIG. 3) and the receiver extracts the encrypted message from the media file (step 38 in FIG. 3). The receiver has knowledge of how the encrypted message is distributed amongst the least significant bits of the media file. The receiver also has knowledge of a key that may be used to decrypt the message and uses this key to decrypt the message (step 40 in FIG. 3).

One limitation of this and other conventional stegonographic techniques is that a party may be subject to coercion. For example, if an adversary learns that a message has been stegonographically hidden in a transmission, the party may be able to extract the encrypted message and apply duress to one of the parties who knows the decryption key to produce the unencrypted message. The party under duress is unable to mislead the adversary with incorrect information because the adversary can determine the validity of the purported key, simply by attempting to decrypt the message. If the resulting product is nonsense, the adversary knows that the key was not a proper one.

SUMMARY OF THE INVENTION

In accordance with a first aspect of the present invention, a method is practiced in a one-time-pad (OTP) cryptosystem that is designed for use with a sending computer system and a receiving computer system that are connected via a communications link. A high security message and a decoy message are composed. In addition, random bit strings and low security messages are provided. A set of OTP keys and cyphertexts are produced from the high security message, the decoy message, the random bit strings and the low security messages. A high security message and the decoy message are embedded in the OTP keys and the cyphertexts. The OTP keys and the cyphertexts are transmitted over the communications link to the receiver, where they may be used to decrypt the cyphertexts and extract the high security message and the decoy message.

In accordance with another aspect of the present invention, a method is practiced in a telecommunications system that has a sender and a receiver. In accordance with this method, a number of cyphertexts and keys are provided for transmission from the sender to the receiver. A secure message is embedded within the keys of the cyphertexts and transmitted to the receiver.

In accordance with an additional aspect of the present invention, a set of encryption keys and cyphertexts are received. This set includes at least one secure message embedded within it. A number of the cyphertexts are decrypted to yield plaintext messages using the received encryption keys. At least one secure message is then extracted from the cyphertexts and encryption keys.

BRIEF DESCRIPTION OF THE DRAWINGS

A preferred embodiment of the present invention will be described below relative to the following drawings.

DETAILED DESCRIPTION OF THE INVENTION

The preferred embodiment of the present invention provides a mechanism where a high security message may be hidden among transmissions of low security messages. The mechanism provides coercion resistance by facilitating the use of decoy messages. The decoy message may be revealed when duress is exerted on a party to reveal an encryption key. The preferred embodiment of the present invention provides multiple levels of security protection and provides a mechanism that can be quickly implemented with low computational overhead. As will be described in more detail below, the preferred embodiment of the present invention employs features of the OTP cryptosystem.

Figure 4:
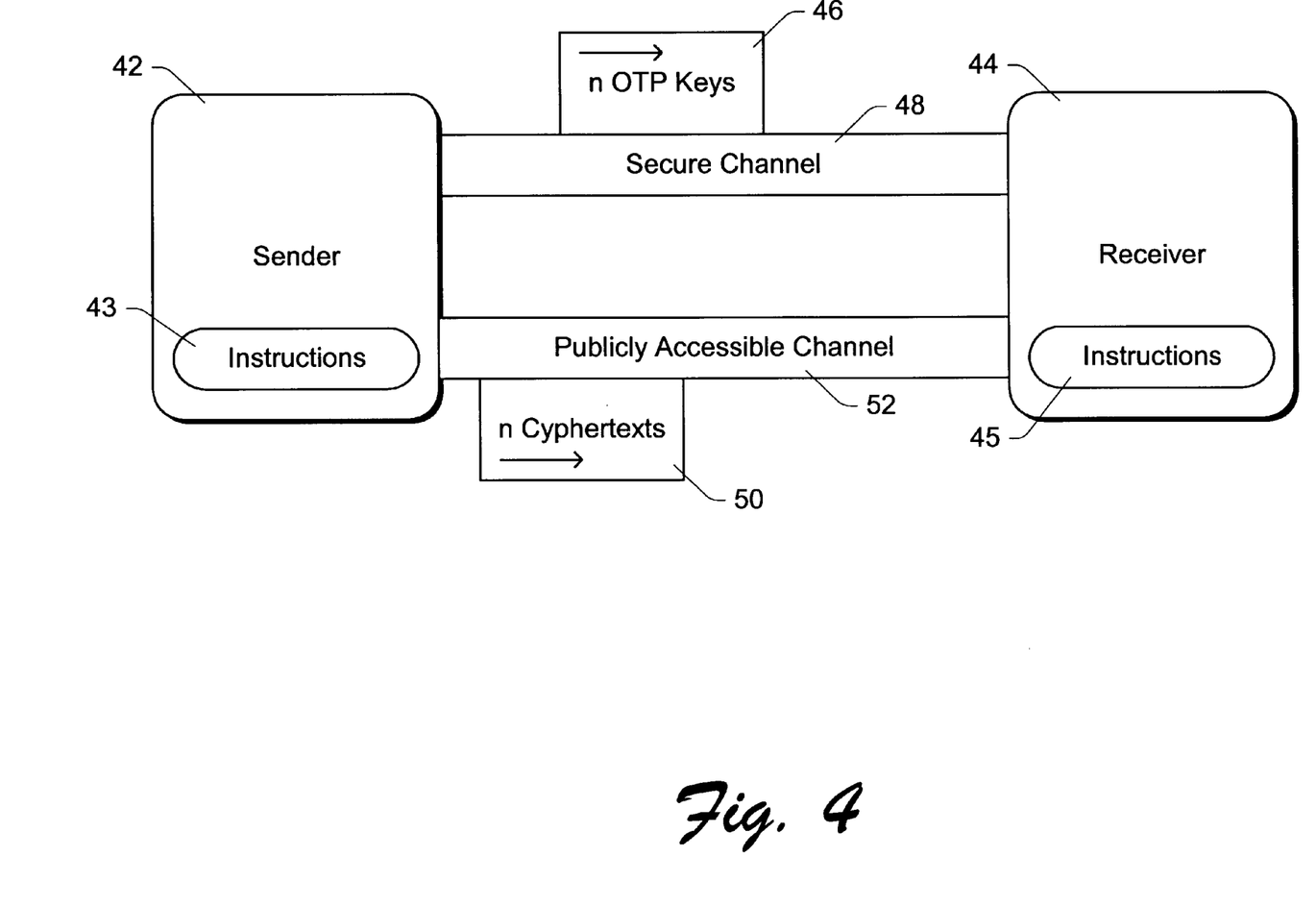
FIG. 4 is a block diagram illustrating components that are used in the preferred embodiment of the present invention.

FIG. 4 is a block diagram that provides an overview of the operation of the preferred embodiment of the present invention. A sender 42 desires to send encrypted messages to a receiver 44. The sender and receiver may be, for example, human parties, software programs or telecommunications equipment. For purposes of the discussion below, it is assumed that the sender and the receiver are computer systems that include programming instructions 43 and 45 for performing the operations detailed below. The communications between the sender 42 and the receiver 44 occur in two stages (although the two stages may occur roughly contemporaneously). In a first stage, n OTP keys 46 are transmitted over a secure channel 48 from the sender to the receiver. These OTP keys are keys that may be used to decrypt OTP-encrypted messages. The second stage of transmissions includes the transmission of n cyphertexts 50 over a publicly accessible channel 52 to the receiver 44. These cyphertexts 50 include low security messages. A high security message and a decoy message may be embedded in the OTP keys and/or cyphertexts The receiver decrypts the cyphertexts 50 and extracts the high security message and/or decoy message, as will be described in more detail below.

The protocol adopted by the preferred embodiment of the present invention will now be described in more detail relative to the flowcharts of FIGS. 5A and 5B. Initially, a sender 42 and receiver 44 agree on a key for a high security message and a key for a decoy message to be used in encrypting the high security message and the decoy message, respectively (step 54 in FIG. 5A). Each of these keys contains 2n bits, where n is an integer chosen by the communicating parties; larger values of n increase the security of the message at the expense of additional computation and transmission. Those skilled in the art will appreciate that the high security message and the decoy message may be encrypted using a number of different conventional encryption techniques. Moreover, these keys may be securely exchanged using any of a number of conventional techniques. Both the high security message and the decoy message will be hidden among the cyphertexts 50 and/or OTP keys 46 that are transmitted from the sender 42 to the receiver 44. The high security message is distinguished from the decoy message in that it contains meaningful content to the receiver 44 whereas the decoy message contains decoy content intended to deceive an adversary.

Figure 5A:
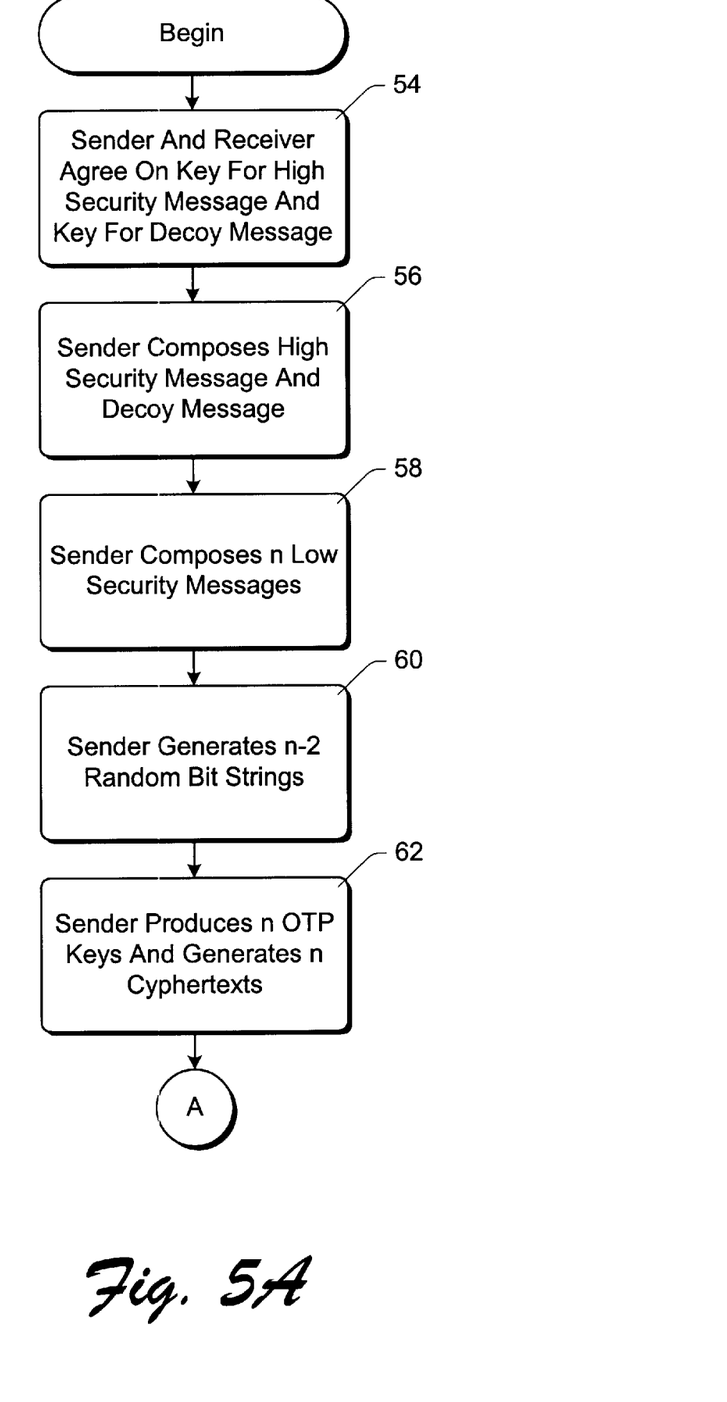
FIGS. 5A and 5B provide an overview of the protocol adopted by the preferred embodiment of the present invention.
Figure 5B:
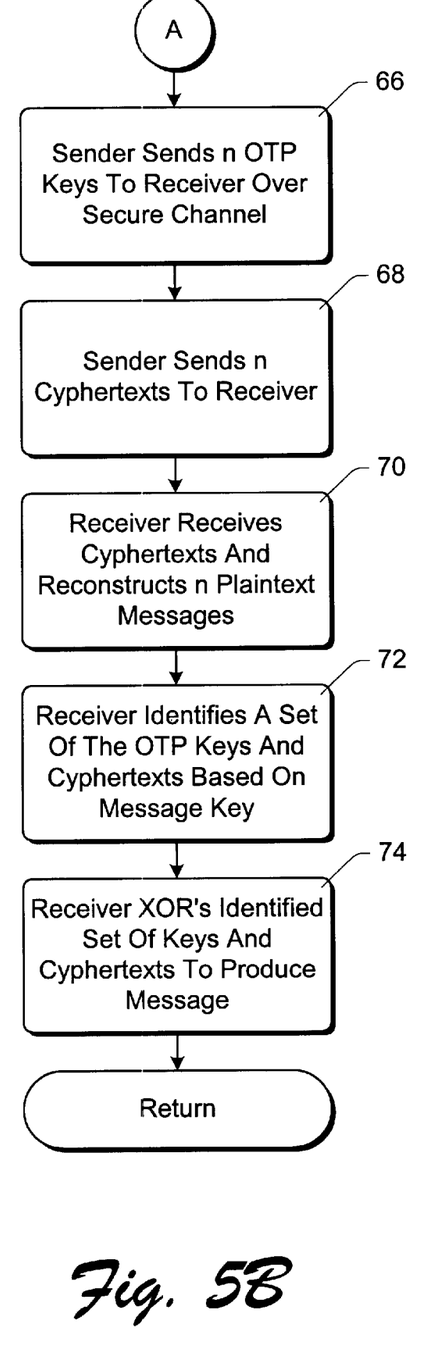

The sender 42 composes the high security message and the decoy message (step 56 in FIG. 5A). The sender 42 also composes n low security messages (step 58 in FIG. 5A). In general, the mechanism utilizes two classes of messages: low security messages that are secure from an eavesdropper that is able to observe all cyphertexts transmitted over the publicly accessible channel 52 and high security messages that are hidden and secure from eavesdroppers of the publicly accessible channel 52, parties that demand a decryption key for transmitted cyphertext, and parties that exert duress to obtain knowledge about messages that are hidden among the low security messages and OTP keys.

The sender 42 generates n–2 random bit strings (step 60 in FIG. 5A). Those skilled in the art will appreciate that there are a number of different techniques for generating such random bit strings. The sender 42 produces n OTP keys, where each key corresponds to one of the cyphertexts that will be transmitted over the publicly accessible channel 52 to the receiver 44; the sender 42 also generates n cyphertexts (step 62 in FIG. 5A).

Figure 6:
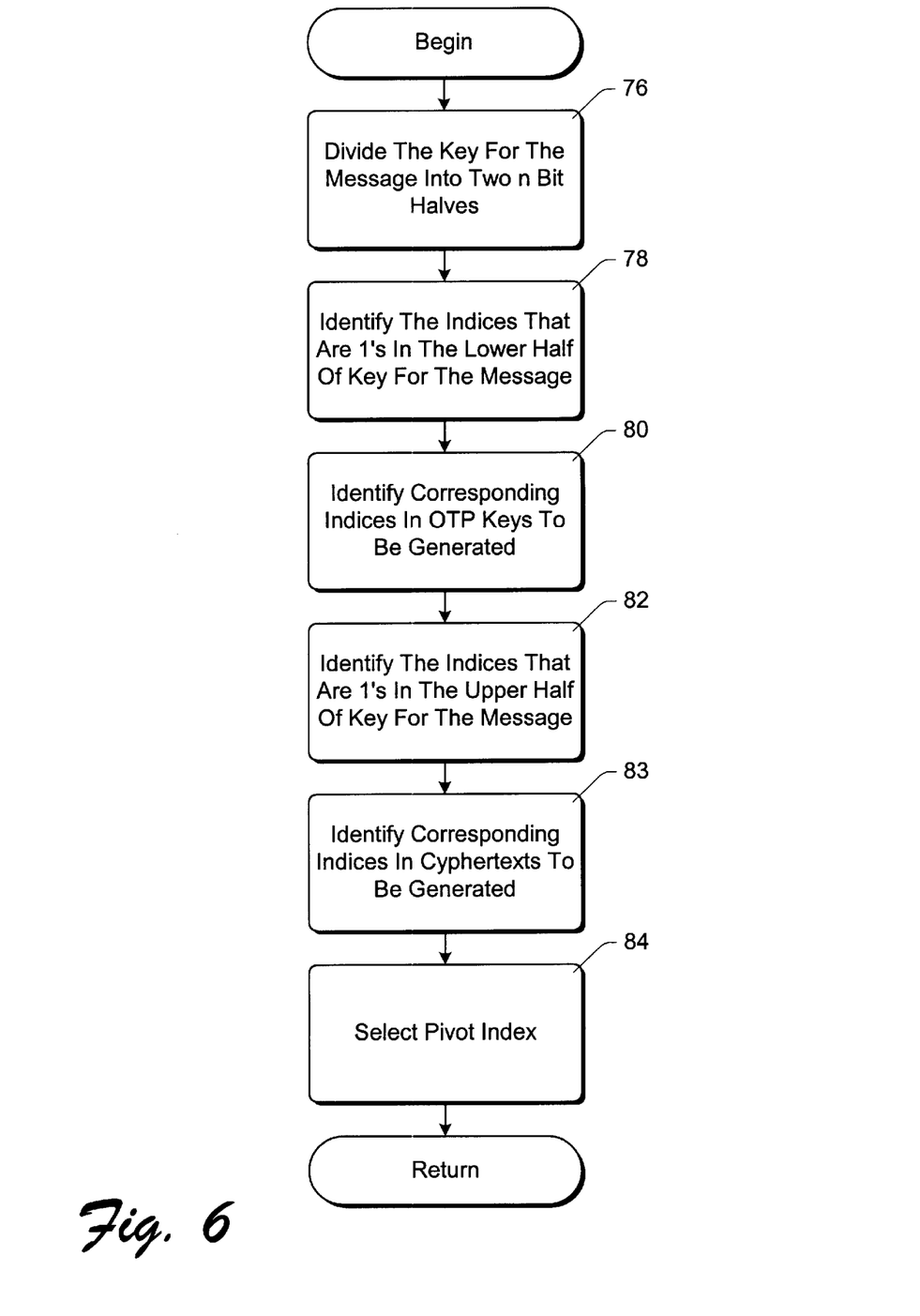
FIG. 6 is a flowchart illustrating the steps that are performed to generate OTP keys and cyphertexts.
Figure 7:
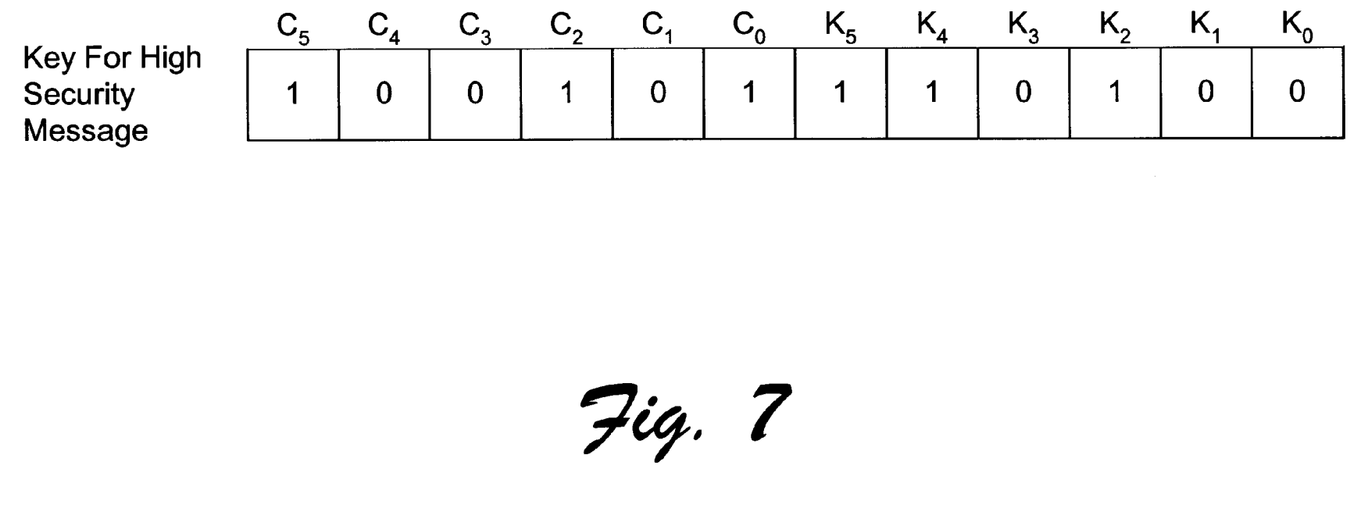
FIG. 7 is an example of a high security message key.
Figure 8:
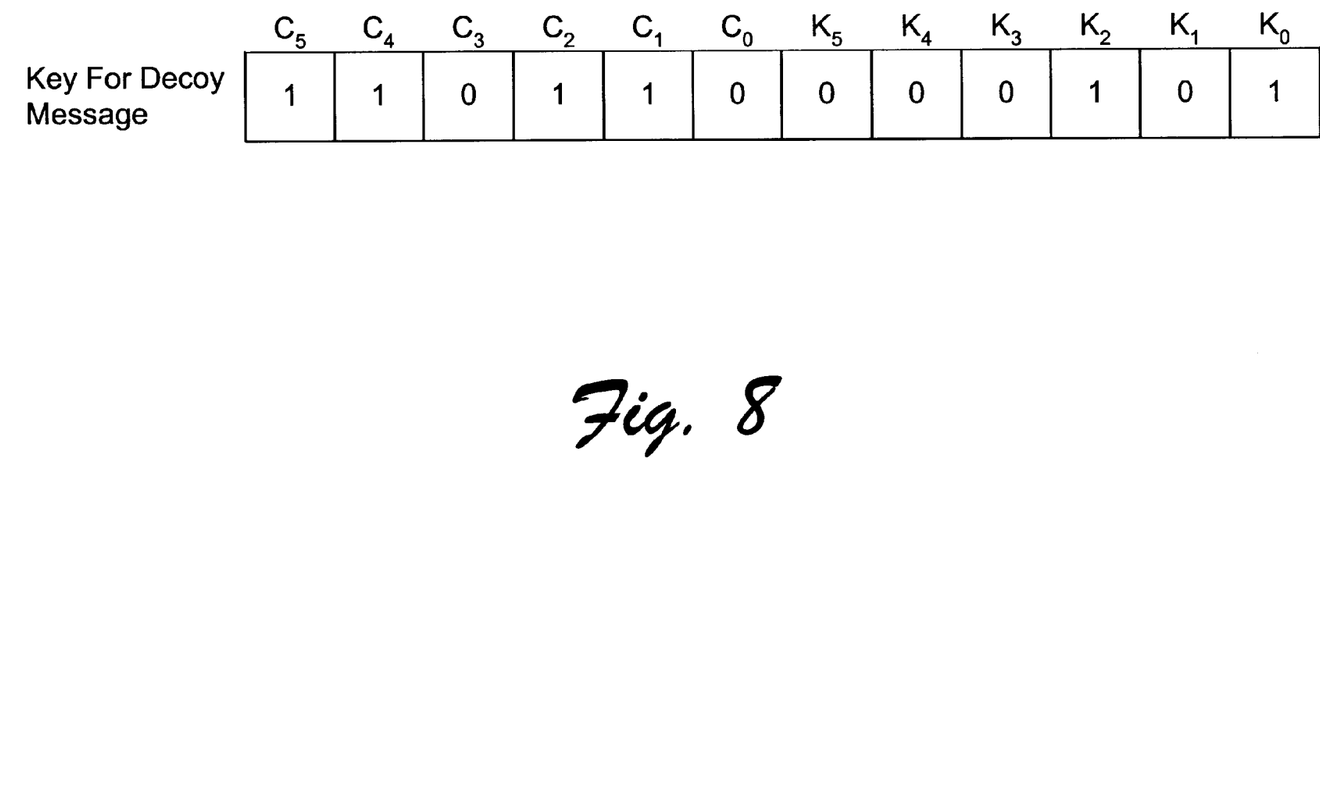
FIG. 8 is an example of a decoy message key.

The set of n OTP keys and n cyphertexts are produced from the random bit strings, the high security message, the decoy message, and the low security messages. FIG. 6 is a flowchart that illustrates the steps that are performed to produce the OTP keys and cyphertext. The steps depicted in FIG. 6 are repeated for the high security message and the decoy message. Initially, the key for the associated message (i.e., the high security message or the decoy message) is divided into two n bit halves (step 76 in FIG. 6). FIG. 7 depicts an example of a 12-bit key for a high security message, and FIG. 8 depicts an example of a 12-bit key for a decoy message. Each bit position in the lower half of the key has an index that corresponds to a given OTP key (i.e, $K_0, \ldots, K_5$). The indices in the lower half of the key for the message that have a value of 1 are identified (step 78 in FIG. 6) and the corresponding OTP keys (that are to be generated) are identified (step 80 in FIG. 6). As can be seen in the example depicted in FIG. 7, n, in this case, is equal to six. The bits corresponding to OTP keys $K_2$, $K_4$ and $K_5$ have a value of 1.

Each bit position in the upper half of the key has an index that corresponds to a given cyphertext (i.e., $C_0, \ldots, C_5$). The indices that are 1's in the upper half of the key for the message are noted. The corresponding indices in the cyphertexts to be generated are noted as well (step 82 in FIG. 6). In the example depicted in FIG. 7, the indices for $C_0$, $C_2$ and $C_5$ have a value of 1.

A pivot index is then selected in the key for the message (step 84 in FIG. 6). An index is eligible to be a pivot index if the bit value in one half of the key is a 0 and the bit value in the other half of the key is 1. For the example depicted in FIG. 7, the available choices of pivot indexes are 0 and 4. The indices 1 and 3 cannot be chosen because the values of $K_1$ and $C_1$ and $K_3$ and $C_3$ are all 0; and the indices 2 and 5 cannot be chosen because the value of $K_2$ and $C_2$ and $K_5$ and $C_5$ are all 1. As such, only the indices 0 and 4 may be chosen. For purposes of the discussion below, assume that the pivot index is chosen to be 0. The OTP key or cyphertext associated with the pivot index that has a value of 1 is referred to as the "pivot" and serves as a repository for embedding the high security message or decoy message. In this example case, the pivot is cyphertext $C_0$.

The above steps of FIG. 6 are repeated for the decoy message, with the additional requirement that the decoy message's pivot index be different from the high security message's pivot index. For the example decoy message shown in FIG. 8, the bits in the key for the message that are associated with OTP keys $K_0$ and $K_2$ have a value of 1, as do the bits associated with cyphertexts $C_1$, $C_2$, $C_4$ and $C_5$. In selecting a pivot index for the decoy message, one cannot select index 3 because both $K_3$ and $C_3$ have a value of 0; one cannot select index 2 since both $K_2$ and $C_2$ have a value of 1; and index 0 may not be selected because this index was selected for the high security message pivot index. Thus, pivot indices of 1, 4 or 5 may be selected. Suppose that a pivot index of 1 is chosen, resulting in cyphertext $C_1$ being the decoy message pivot.

Figure 9:
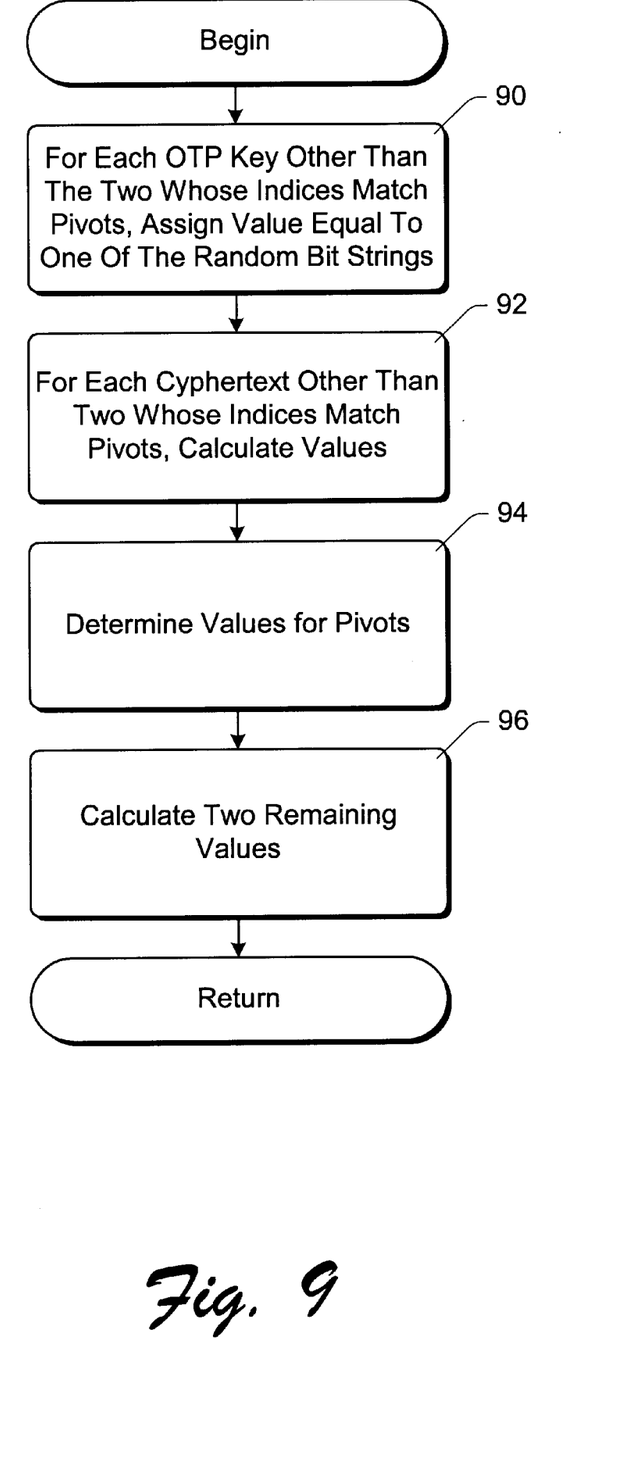
FIG. 9 is a flowchart illustrating the steps that are performed to complete the generation of the cyphertexts and OTP keys.

The steps depicted in FIG. 9 are then performed to complete the generation of the OTP keys and cyphertexts. For each OTP key other than the two OTP keys whose indices match pivots, the OTP key is assigned a value equal to one of the random bit strings (step 90 in FIG. 9). Thus, for example, for random bit strings $R_0, \ldots, R_3$, the OTP keys whose indices do not match those of the pivots are assigned as follows:

$$K_2 = R_0$$
$$K_3 = R_1$$
$$K_4 = R_2$$
$$K_5 = R_3$$

The cyphertexts are then assigned values. In particular, for each cyphertext other than those whose indices match the pivots, the values are calculated as set forth below (step 92 in FIG. 9).

$$C_2 = P_2 \oplus K_2$$
$$C_3 = P_3 \oplus K_3$$
$$C_4 = P_4 \oplus K_4$$
$$C_5 = P_5 \oplus K_5$$

where $P_i$ equals the ith low security message, and $\oplus$ is an exclusive OR operation.

The high security message and decoy message are related to the cyphertexts and OTP keys for the example cases depicted in FIGS. 7 and 8 as follows:

$$M = C_5 \oplus C_2 \oplus C_0 \oplus K_5 \oplus K_4 \oplus K_2$$
$$D = C_5 \oplus C_4 \oplus C_2 \oplus C_1 \oplus K_2 \oplus K_0$$

where M is the high security message; D is the decoy message. The specific OTP keys and cyphertexts included in each of these equations are determined by the bits that are ones in the high security and decoy keys, respectively. These equations are used to determine values for the pivots (step 94 in FIG. 9). As was discussed above, for the example cases depicted in FIGS. 7 and 8, the pivots are $C_0$ and $C_1$, respectively. The equations for the high security message and the decoy message are used to solve for the pivot values, yielding the following equations:

$$C_0 = M \oplus C_5 \oplus C_2 \oplus K_5 \oplus K_4 \oplus K_2$$
$$C_1 = D \oplus C_5 \oplus C_4 \oplus C_2 \oplus K_2 \oplus K_0$$

The two remaining values that correspond to the bit positions in the keys that have a value of 0 with the pivot indices are then calculated (step 96 in FIG. 9). For the example depicted in FIGS. 7 and 8, the remaining values are $K_0$ and $K_1$, which are calculated as follows:

$$K_0 = P_0 \oplus C_0$$
$$K_1 = P_1 \oplus C_1$$

By performing the above-described steps, the sender 42 is able to produce the n OTP keys and n cyphertexts in steps 62 and 64. The sender 42 then sends the n OTP keys to the receiver 44 over the secure channel 48 (step 66 in FIG. 5B). Sender 42 sends n cyphertexts to the receiver 44 over the publicly accessible channels 52 (step 68 in FIG. 5B). It should be noted that a substantial time may elapse between when the OTP keys 46 are sent to the receiver 44 and when the cyphertexts 50 are sent to the receiver. The receiver receives the cyphertexts 50 and reconstructs the plaintext messages utilizing the OTP keys 46 that were sent earlier over the secure channel (step 70 in FIG. 5B). This is a straightforward operation given the keys. The receiver identifies a set of the OTP keys and cyphertexts based on the high security message key (step 72 in FIG. 5B). The set of OTP keys and cyphertexts are those that have a value of 1 in the associated bit positions in the key for the high security message.

As was discussed above, the sender 42 and the receiver 44 have already agreed on a key for the high security message and the decoy message. Thus, the receiver 44 knows which OTP keys and cyphertexts to utilize. The receiver 44 XORs the identified set of keys and cyphertexts to produce both the high security message and the decoy message as needed (step 74 in FIG. 5B). The equations for these messages are set forth above.

The keys for the high security message and the decoy message must meet several conditions in order to be usable in the above-described scheme. First, neither key may have only a single bit set. Such a situation would cause one of the OTP keys or one of the cyphertexts to be equal to the message. In addition, neither key may have a value such that the most significant n bits are equal to the least significant n bits. This would result in no unmatched OTP key or cyphertext being left to select as the pivot. Lastly, the pair of keys may not be such that if, for each key, the n most significant bits are XORed with the n least significant bits, there is exactly one-bit set and the index of this single bit set is the same in both keys. In such a case, there is not a separate pivot available for the high security message and the decoy message.

Figure 10:
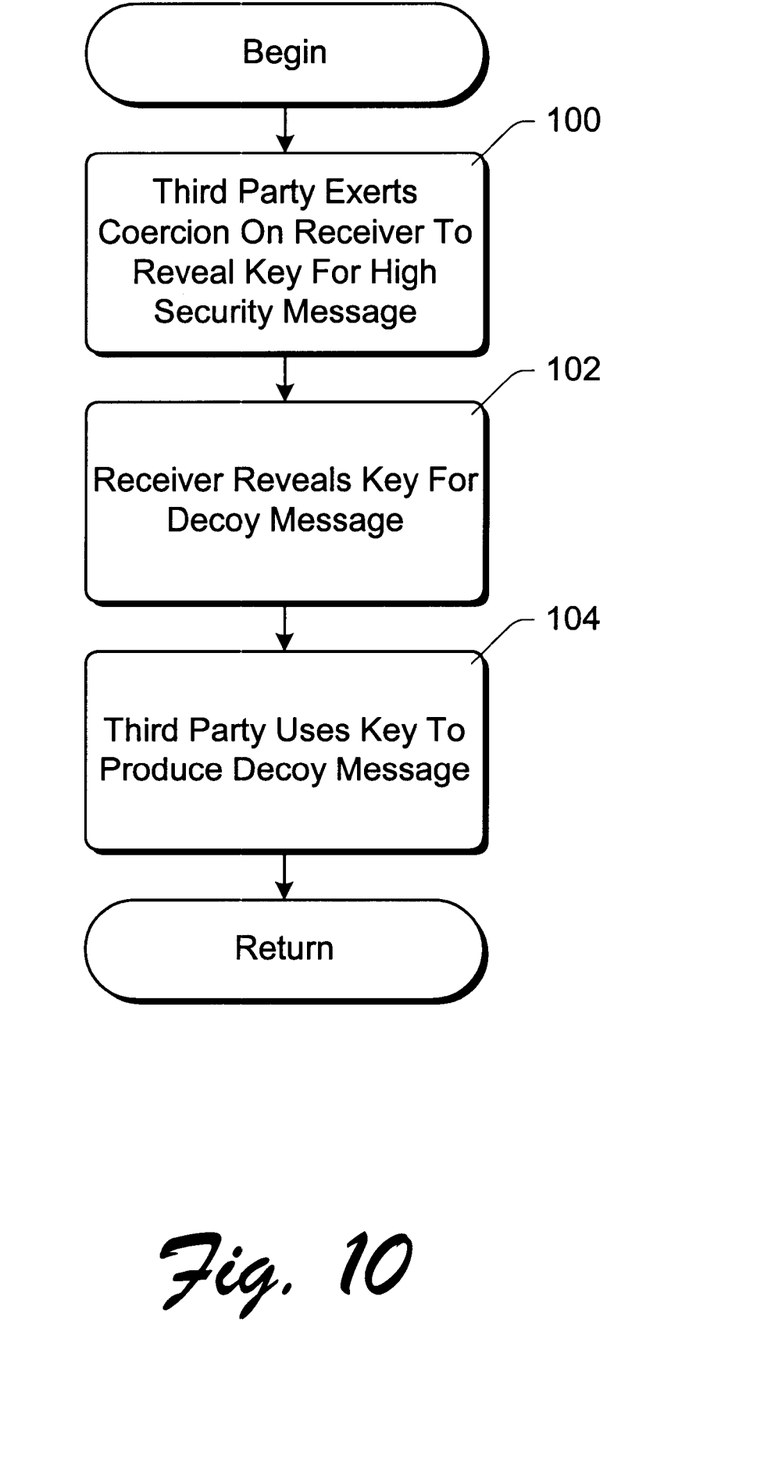
FIG. 10 is a flowchart illustrating the steps that may be performed in the preferred embodiment of the present invention when duress is exerted on a party involved in the protocol.

As was also discussed above, the preferred embodiment of the present invention provides coercion resistance. FIG. 10 is a flowchart that illustrates the steps that are performed when an adversary exerts duress against the receiver. Initially, a third party exerts coercion on a receiver to reveal the key for the high security message (step 100 in FIG. 10). The receiver, instead, reveals the key for the decoy message (step 102 in FIG. 10). The third party then uses the key to produce the decoy message (step 104 in FIG. 10). Since the decoy message appears to be a valid message, the third party is not aware that he has been duped. This technique, thus, provides an added level of security to the preferred embodiment of the present invention.

In order to appreciate the security provided by the preferred embodiment of the present invention, it is helpful to consider three different types of adversary. The first type of adversary is able to observe all cyphertexts that are transmitted between the sender and the receiver but sees nothing else. This type of adversary will not be able to decipher any of the information that is sent over the publicly accessible channel because all such transmissions are encrypted. Thus, the preferred embodiment of the present invention is secure as to that type of adversary.

A second type of adversary is able to observe all cyphertexts transmitted over the publicly accessible channel and is also able to demand the decryption keys for the transmitted cyphertexts. The preferred embodiment of the present invention assures that the high security message will be secure as to such a type of adversary. The low security messages, however, are not secure relative to such a type of adversary. A third type of adversary has the capabilities of the second type of adversary but is also able to apply duress to either the sender or receiver to obtain knowledge of how hidden messages may be sent. The decoy message provides security against this third type of adversary by allowing the sender or receiver to reveal how the decoy message is hidden in the cyphertext and to reveal the key for the decoy message.

Those skilled in the art will appreciate that various alternatives may be utilized to practice the preferred embodiment of the present invention. For example, there is no need that the low security messages be transmitted as separate messages but rather may be aggregated into a single transmission that comprises a single message.

Moreover, those skilled in the art will appreciate that the decoy message is not a necessary part of the present invention; rather the above described protocol may be used to transmit a high security message without a decoy. Still further, more than two hidden messages may be sent via this protocol. Specifically, up to n−1 high security messages can be supported but at the price of weakening the security provided to those messages. Still further, functions other than the exclusive OR may be utilized to encrypt messages that are sent over the publicly accessible channel.

While the present invention has been described with reference to a preferred embodiment thereof, those skilled in the art will appreciate that various changes in form and detail may be made without departing from the intended scope of the present invention as defined in the appended claims.

We claim:

1. In a one-time pad (OTP) cryptosystem for use with a sending computer system and a receiving computing system connected via a communications link, a method comprising the steps of:
   composing a high security message and a decoy message;
   providing random bit strings and low security messages;
   producing a set of OTP keys and cyphertexts from the high security message, the decoy message, the random bit strings and the low security messages, wherein the high security message and the decoy message are embedded in the set of OTP keys and cyphertexts, and wherein the high security message is distributed among a subset of the OTP keys and the cyphertexts; and
   transmitting the OTP keys and the cyphertexts over the communications link to the receiver.

2. In a one-time pad (OTP) cryptosystem for use with a sending computer system and a receiving computing system connected via a communications link, a method comprising the steps of:
   composing a high security message and a decoy message;
   providing random bit strings and low security messages;
   producing a set of OTP keys and cyphertexts from the high security message, the decoy message, the random bit strings and the low security messages, wherein the high security message and the decoy message are embedded in the set of OTP keys and cyphertexts, and wherein the decoy message is distributed among a subset of the OTP keys and the cyphertexts; and
   transmitting the OTP keys and the cyphertexts over the communications link to the receiver.

3. In a computer system, a method comprising:
   generating, using a plurality of keys, a plurality of cyphertexts for transmission to a receiver;
   embedding a message within the plurality of keys; and
   transmitting the plurality of keys to the receiver.

4. The method of claim 3 wherein the cyphertexts are generated in accordance with a one-time-pad encryption protocol.

5. The method of claim 4 wherein the cyphertexts are generated using an exclusive OR function.

6. The method of claim 3 further comprising embedding multiple secure messages within the plurality of keys.

7. The method of claim 3 wherein the message includes a decoy message and a high security message.

8. In a computer system, a method comprising:
   receiving a plurality of cyphertexts; receiving a plurality of encryption keys within which is embedded at least one secure message;
   decrypting, using the plurality of encryption keys, a number of the plurality of cyphertexts to yield plaintext messages; and
   extracting the at least one secure message from the plurality of encryption keys.

9. The method of claim 8 wherein the plurality of cyphertexts are encrypted using a one-time pad (OTP) encryption scheme and the plurality of encryption keys comprise a plurality of OTP keys.

10. The method of claim 8 wherein the plurality of encryption keys are received separately from the plurality of cyphertexts.

11. The method of claim 8 wherein multiple secure messages are embedded in the plurality of encryption keys.

12. The method of claim 11 wherein the multiple secure messages are extracted from the plurality of encryption keys.

13. The method of claim 11 wherein at least one of the multiple secure messages is a decoy message.

14. The method of claim 8, further comprising revealing information to a third party to enable the third party to decrypt one of the at least one secure messages that is a decoy message.

15. In a one-time pad (OTP) cryptosystem for use with a sending computer system and a receiving computing system connected via a communications link, a computer-readable medium holding computer-executable instructions for performing, a method comprising the steps of:
   composing a high security message and a decoy message;
   providing random bit strings and low security messages;
   producing a set of OTP keys and cyphertexts from the high security message, the decoy message, the random bit strings and the low security messages, wherein the high security message and the decoy message are embedded in the set of OTP keys and cyphertexts, wherein the high security message is distributed among a subset of the OTP keys and the cyphertexts; and
   transmitting the OTP keys and the cyphertexts over the communications link to the receiver.

16. In a one-time pad (OTP) cryptosystem for use with a sending computer system and a receiving computing system connected via a communications link, a computer-readable medium holding computer-executable instructions for performing, a method comprising the steps of:
   composing a high security message and a decoy message;
   providing random bit strings and low security messages;
   producing a set of OTP keys and cyphertexts from the high security message, the decoy message, the random bit strings and the low security messages, wherein the high security message and the decoy message are embedded in the set of OTP keys and cyphertexts, wherein the decoy message is distributed among a subset of the OTP keys and the cyphertexts; and transmitting the OTP keys and the cyphertexts over the communications link to the receiver.

17. The method of claim 3, further comprising transmitting the plurality of cyphertexts to the receiver.

18. One or more computer-readable memories containing a computer program that is executable by a processor to perform the method recited in claim 3.

19. One or more computer-readable memories containing a computer program that is executable by a processor to perform the method recited in claim 1.

20. One or more computer-readable memories containing a computer program that is executable by a processor to perform the method recited in claim 2.

21. One or more computer-readable memories containing a computer program that is executable by a processor to perform the method recited in claim 8.

22. One or more computer-readable memories containing a computer program that is executable by a processor to perform the method recited in claim 15.

23. One or more computer-readable memories containing a computer program that is executable by a processor to perform the method recited in claim 16.

24. A method comprising:

generating a plurality of keys;

generating, using the plurality of keys, a plurality of cyphertexts; and transmitting, as a set of keys, the plurality of keys and an encrypted high security message to a receiver.

25. The method of claim 24, further comprising transmitting, as part of the set of keys, an encrypted decoy message.

26. The method of claim 24, further comprising generating the encrypted high security message by encrypting a high security message based at least in part on the plurality of keys.

27. One or more computer-readable memories containing a computer program that is executable by a processor to perform the method recited in claim 24.

28. In a system having a sender and a receiver, a method comprising:

generating a first key;

generating a plurality of additional keys;

generating, based at least in part on the plurality of additional keys, a plurality of cyphertexts for transmission from the sender to the receiver;

determining, based at least in part on the first key, whether to embed a secure message within the plurality of additional keys or the plurality of cyphertexts;

embedding the secure message within either the plurality of additional keys or the plurality of cyphertexts based on the determining; and transmitting the plurality of additional keys and the plurality of cyphertexts to the receiver.

29. The method of claim 28 wherein the transmitting comprises transmitting the plurality of additional keys over a secure channel to the receiver.

30. The method of claim 28 wherein the transmitting comprises transmitting the plurality of cyphertexts over a non-secure channel to the receiver.

31. The method of claim 28 wherein the generating the plurality of additional keys comprises assigning at least one of the plurality of additional keys a random value.

32. The method of claim 31 wherein the generating the plurality of additional keys comprises assigning each of the plurality of additional keys a different random value.

33. The method of claim 28 wherein the generating the plurality of cyphertexts comprises generating at least one of the cyphertexts by exclusive ORing one of the plurality of additional keys with a low security message.

34. The method of claim 28 wherein the generating the plurality of additional keys comprises, for a selected one of the plurality of additional keys, producing the selected one by exclusive ORing the secure message with at least one of the plurality of cyphertexts and at least one of the plurality of additional keys.

35. The method of claim 28 wherein the generating the plurality of cyphertexts comprises, for a selected one of the plurality of cyphertexts, producing the selected one by exclusive ORing the secure message with at least one of the plurality of cyphertexts and at least one of the plurality of additional keys.

36. The method of claim 28 wherein the generating the plurality of additional keys comprises, for a selected one of the plurality of additional keys, producing the selected one by exclusive ORing a decoy message with at least one of the plurality of cyphertexts and at least one of the plurality of additional keys.

37. The method of claim 28 wherein the generating the plurality of cyphertexts comprises, for a selected one of the plurality of cyphertexts, producing the selected one by exclusive ORing a decoy message with at least one of the plurality of cyphertexts and at least one of the plurality of additional keys.

38. The method of claim 28, further comprising:

determining, based at least in part on a second key, whether to embed a decoy message within the plurality of additional keys or the plurality of cyphertexts; and embedding the decoy message within either the plurality of additional keys or the plurality of cyphertexts.

39. The method of claim 38 wherein the determining whether to embed the decoy message in the plurality of additional keys or the plurality of cyphertexts comprises:

dividing the second key into a first portion and a second portion;

comparing each bit in the first portion with a corresponding bit in the second portion;

identifying a set of bits in the first portion that differ from the corresponding bits in the second portion;

selecting one bit of the set of bits; and if the selected one bit of the set of bits has a first value, then determining to embed the decoy message in the plurality of additional keys, otherwise determining to embed the decoy message in the plurality of cyphertexts.

40. The method of claim 28 wherein the determining whether to embed the secure message in the plurality of additional keys or the plurality of cyphertexts comprises:

dividing the first key into a first portion and a second portion;

comparing each bit in the first portion with a corresponding bit in the second portion;

identifying a set of bits in the first portion that differ from the corresponding bits in the second portion;

selecting one bit of the set of bits; and if the selected one bit of the set of bits has a first value, then determining to embed the secure message in the plurality of additional keys, otherwise determining to embed the secure message in the plurality of cyphertexts.

41. The method of claim 40 wherein each bit in at least a subset of bits in the first portion corresponds to one of the plurality of cyphertexts and each bit in at least a subset of bits in the second portion corresponds to one of the plurality of additional keys.

42. The method of claim 40 wherein the first portion comprises a first half of the first key and the second portion comprises a second half of the first key.

43. The method of claim 40 wherein the first value comprises zero.

44. One or more computer-readable memories containing a computer program that is executable by a processor to perform the method recited in claim 28.

45. A computer system comprising:

a processor;

a memory device, coupled to the processor, storing one or more programs that, when executed by the processor, cause the processor to:

generate a first key;

generate a plurality of additional keys;

generate a plurality of cyphertexts for transmission from the computer system to a receiver;

determine, based at least in part on the first key, whether to embed a high security message within the plurality of additional keys or the plurality of cyphertexts;

embed the high security message within either the plurality of additional keys or the plurality of cyphertexts based on the determining; and transmit the plurality of additional keys and the plurality of cyphertexts to the receiver.

46. The computer system of claim 45, wherein the one or more programs, when executed by the processor, further cause the processor to:

determine, based at least in part on a second key, whether to embed a decoy message within the plurality of additional keys or the plurality of cyphertexts; and embed the decoy message within either the plurality of additional keys or the plurality of cyphertexts.

47. In a system having a sender and a receiver, a method comprising:

receiving a first key from the sender;

receiving a plurality of additional keys from the sender;

receiving a plurality of cyphertexts from the sender;

determining, based at least in part on the first key, whether a secure message is embedded within the plurality of additional keys or the plurality of cyphertexts; and retrieving the secure message from either the plurality of additional keys or the plurality of cyphertexts based on the determining.

48. The system of claim 47 wherein the receiving the plurality of additional keys from the sender comprises receiving the plurality of additional keys from the sender over a secure channel to the receiver.

49. The system of claim 47 wherein the receiving the plurality of cyphertexts from the sender comprises receiving the plurality of cyphertexts from the sender over a non-secure channel.

50. The system of claim 47, further comprising:

determining, based at least in part on a second key, whether a decoy message is embedded within the plurality of additional keys or the plurality of cyphertexts; and retrieving the decoy message from either the plurality of additional keys or the plurality of cyphertexts.

51. The method of claim 50 wherein the determining whether the decoy message is embedded within the plurality of additional keys or the plurality of cyphertexts comprises:

dividing the second key into a first portion and a second portion;

comparing each bit in the first portion with a corresponding bit in the second portion;

identifying a set of bits in the first portion that differ from the corresponding bits in the second portion;

selecting one bit of the set of bits; and if the selected one bit of the set of bits has a first value, then determining the decoy message is embedded within the plurality of additional keys, otherwise determining the decoy message is embedded within the plurality of cyphertexts.

52. The method of claim 47 wherein the determining whether the secure message is embedded within the plurality of additional keys or the plurality of cyphertexts comprises:

dividing the first key into a first portion and a second portion;

comparing each bit in the first portion with a corresponding bit in the second portion;

identifying a set of bits in the first portion that differ from the corresponding bits in the second portion;

selecting one bit of the set of bits; and if the selected one bit of the set of bits has a first value, then determining the secure message is embedded within the plurality of additional keys, otherwise determining the secure message is embedded within the plurality of cyphertexts.

53. The method of claim 52 wherein each bit in at least a subset of bits in the first portion corresponds to one of the plurality of cyphertexts and each bit in at least a subset of bits in the second portion corresponds to one of the plurality of additional keys.

54. The method of claim 52 wherein the first portion comprises a first half of the first key and the second portion comprises a second half of the first key.

55. The method of claim 52 wherein the first value comprises zero.

56. One or more computer-readable memories containing a computer program that is executable by a processor to perform the method recited in claim 53.

57. A system comprising:

a sending computer system to, generate a plurality of keys, generate a plurality of low security message cyphertexts based at least in part on both the plurality of keys and a plurality of low security messages, generate a cyphertext for a high security message based at least in part on the plurality of keys and the plurality of low security message cyphertexts, and generate a cyphertext for a decoy message based at least in part on the plurality of keys and the plurality of low security message cyphertexts; and a receiving computer system to, receive the plurality of keys, the plurality of low security message cyphertexts, the cyphertext for the high security message, and the cyphertext for the decoy message from the sending computer system, and decrypt the high security message from the cyphertext for the high security message.

58. The system of claim 57 wherein the plurality of keys comprise a plurality of one-time pad (OTP) keys.

59. The system of claim 57 wherein the sending computer system is further to embed the cyphertext for the high security message in the plurality of keys.

60. The system of claim 57, wherein the sending computer system is further to embed the cyphertext for the decoy message in the plurality of keys.

61. One or more computer-readable storage media having stored thereon a computer program, the program comprising the following steps:

identifying a first key corresponding to a high security message;

identifying a second key corresponding to a decoy message;

generating a plurality of one-time pad (OTP) keys;

generating a plurality of cyphertexts based at least in part on both the plurality of OTP keys and a plurality of low security messages;

determining, using the first key, whether to embed the high security message in the plurality of OTP keys or the plurality of cyphertexts;

determining, using the second key, whether to embed the decoy message in the plurality of OTP keys or the plurality of cyphertexts;

encrypting the high security message using both the plurality of cyphertexts and the plurality of OTP keys;

embedding the high security message in either the plurality of OTP keys or the plurality of cyphertexts;

encrypting the decoy message using both the plurality of cyphertexts and the plurality of OTP keys; and embedding the decoy message in either the plurality of OTP keys or the plurality of cyphertexts.

62. The computer-readable storage media of claim 61 wherein the determining whether to embed the high security message in the plurality of OTP keys or the plurality of cyphertexts comprises:

dividing the first key into a first half and a second half;

comparing each bit in the first half with a corresponding bit in the second half;

identifying a set of bits in the first half that differ from the corresponding bits in the second half;

selecting one bit of the set of bits; and if the selected one bit of the set of bits has a value of zero, then determining to embed the high security message in the plurality of OTP keys, otherwise determining to embed the high security message in the plurality of cyphertexts.

63. The computer-readable storage media of claim 62 wherein each of at least a subset of bits in the first half corresponds to one of the plurality of cyphertexts and each of at least a subset of bits in the second half corresponds to one of the plurality of OTP keys.

64. The computer-readable storage media of claim 61 wherein:

the determining whether to embed the high security message in the plurality of OTP keys or the plurality of cyphertexts comprises:

dividing the first key into a first half and a second half;

comparing each bit in the first half of the first key with a corresponding bit in the second half of the first key;

identifying a first set of bits in the first half of the first key that differ from the corresponding bits in the second half of the first key;

selecting one bit of the first set of bits;

if the selected one bit of the first set of bits has a value of zero, then determining to embed the high security message in the plurality of OTP keys, otherwise determining to embed the high security message in the plurality of cyphertexts; and the determining whether to embed the decoy message in the plurality of OTP keys or the plurality of cyphertexts comprises:

dividing the second key into a first half and a second half;

comparing each bit in the first half of the second key with a corresponding bit in the second half of the second key;

identifying a second set of bits in the first half of the second key that differ from the corresponding bits in the second half of the second key;

selecting one bit of the second set of bits; and if the selected one bit of the second set of bits has a value of zero, then determining to embed the decoy message in the plurality of OTP keys, otherwise determining to embed the decoy message in the plurality of cyphertexts.

* * * * *